United States Patent [19]

Baucke et al.

[11] Patent Number: 4,909,610

[45] Date of Patent: Mar. 20, 1990

[54] PROCESS FOR CHARGING AN ELECTROCHROMIC SYSTEM WITH HYDROGEN

[75] Inventors: Friedrich Baucke, Mainz; Jutta Braun, Flörsheim, both of Fed. Rep. of Germany

[73] Assignee: Schott Glaswerke, Mainz, Fed. Rep. of Germany

[21] Appl. No.: 261,527

[22] Filed: Oct. 24, 1988

[30] Foreign Application Priority Data

Oct. 24, 1987 [DE] Fed. Rep. of Germany ....... 3736076

[51] Int. Cl.$^4$ .............................................. G02F 1/17
[52] U.S. Cl. ................................................. 350/357
[58] Field of Search ............... 350/357, 353, 355, 356; 340/785

[56] References Cited

U.S. PATENT DOCUMENTS

4,502,934  3/1985  Gazard et al. .................. 350/357 X

FOREIGN PATENT DOCUMENTS

0229438  7/1987  European Pat. Off. .
3008768  4/1985  Fed. Rep. of Germany .
0267918  11/1988  Japan .................................. 350/357

OTHER PUBLICATIONS

Baucke et al., "Elektrochrome Schichtsysteme mit Variierbaren Optischen Eigenschaften," *Physik in unserer Zeit*, 18 Jahrg. 1987, nr. 1, pp. 21-28.

Primary Examiner—Eugene R. LaRoche
Assistant Examiner—Nathan McCutcheon
Attorney, Agent, or Firm—Millen, White & Zelano

[57] ABSTRACT

For charging an electrochromic layered package with hydrogen and for applying a backing to a layered package comprising a transparent substrate plate disposed on the front, at least two electrodes, where, of these two electrodes, the first electrode after this substrate plate (first electrode) is a transparent electrode, at least one electrochromic layer, a hydrogen-storing layer, a hydrogen ion-conducting layer and a backing which seals the layered package and directly follows the second of the two electrodes, an electrochromic layered system is initially, before application of the backing and after application of the second electrode, which is to be followed by the backing, electrolytically charged, in a first step, with hydrogen from a hydrogen ion-containing electrolyte solution and, in a second step, a metal layer is deposited reductively, preferably electrolytically, as a backing which provides sealing against $H_2$ loss and $H_2O$ exchange, onto the second electrode from a solution containing the pertinent metal as the ion, and the layered package is then completed.

31 Claims, 3 Drawing Sheets

PROCESS FOR CHARGING AN ELECTROCHROMIC SYSTEM WITH HYDROGEN

CROSS-REFERENCE TO RELATED APPLICATIONS

This invention is related to a commonly assigned concurrently filed application by Friedrich G. K. Baucke, Jutta Braun and Bernd Metz, entitled "Electrochromic Layer Set," Ser. No. 261,526.

BACKGROUND OF THE INVENTION

The present invention relates in general to electronic devices and in particular to a process for charging an electrochromic layered package (mirror) with hydrogen and for applying a backing to an electrochromic layered package (mirror). A layered package of this type comprises a transparent substrate plate disposed on the front, at least two electrodes, where, of these two electrodes, the first after this substrate plate (first electrode) is a transparent electrode, at least one electrochromic layer, a hydrogen-storing layer, a hydrogen ion-conducting layer, and a backing which seals the layered package and immediately follows the second of the two electrodes.

Electrochromic materials are materials which change their optical constants (n and k) when an electrical field is applied, retain this state when the field is switched off, and return to the initial state when the polarity is reversed, the electrochromic material being involved in a redox process.

Typical examples of electrochromic materials are $WO_3$ and $MoO_3$, which are colorless and transparent when applied in a thin layer to a glass substrate. However, if a voltage of suitable strength is applied to a layer of this type, suitable ions, for example protons, migrate from one side and electrons migrate from the other side into this layer and form blue tungsten bronze or molybdenum bronze, $H_xWO_3$ or $H_xMoO_3$ respectively. The intensity of the coloration is determined by the amount of charge flowing into the layer.

Electrochromic layered packages having optical properties which can be changed at will, in particular having a controllable light absorption, are of considerable interest for a wide variety of uses, e.g., for displays, for transparent optical instruments—spectacles and light valves—and reflective systems—mirrors and reflective displays.

Possible constructions of electrochromic layered packages by means of different layer arrangements are described, for example, in Schott Information 1983, No. 1, p. 11, German Pat. No. 3,008,768, Chemistry in Britain, 21 (1985), 643 or Dechema-Monographien, Volume 102—VCH Verlagssgesellschaft 1986, p. 483.

Electrochromic mirrors as described in German Pat. No. 3,008,768 are constructed exclusively from solid layers, which yields certain advantages over electrochromic mirrors with liquid electrolytes, as described, for example, in U.S. Pat. No. 3,844,636 (e.g. lower thickness of the overall system, no leakage of the acid used as electrolyte on damage and fracture of the system). There are various possible arrangements of the individual layers for the construction of an electrochromic mirror. The layer sequence below (in the viewing direction) is intended merely to represent an example of a possible construction:

glass substrate
transparent electrode
electrochromic electrode
solid hydrogen ion-conducting layer
hydrogen ion-permeable reflector
solid hydrogen ion-conducting layer
hydrogen ion-storing layer
catalytic layer which is simultaneously an electrode
adhesive
sealing plate.

If the reflectivity of the mirror is to be reduced, the absorption of the electrochromic layer is increased by intensifying the color: the transparent electrode is connected as the cathode and the electrode located behind the ion-storing layer is connected as the anode. Protons move frontally (i.e., in the direction of the electrochromic electrode) from the ion-storing layer through layers which are permeable to ions but not electrons, into the electrochromic layer, and electrons pass from the voltage source via the transparent electrode directly into the electrochromic layer. A redox reaction then takes place in the electrochromic material, for example $WO_3$, with formation of blue tungsten bronze $H_xWO_3$:

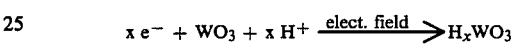

$$x\,e^- + WO_3 + x\,H^+ \xrightarrow{\text{elect. field}} H_xWO_3$$

x is known as the depth of reaction and the degree of the light absorption of the electrochromic layer is dependent thereon.

Since the electrochromic reaction is reversible, the reaction can be reversed by reversing the polarity of the electrical field applied to darken the electrochromic layer, and the electrochromic layer is thus lightened again. The electrode disposed immediately in front of the backing (in the example the adhesive and sealing plate) is connected as the cathode, which causes the protons to be transported back into the proton-storing layer:

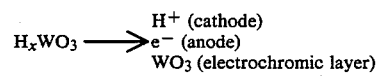

$$H_xWO_3 \xrightarrow{\begin{array}{l}H^+ \text{ (cathode)}\\ e^- \text{ (anode)}\end{array}} WO_3 \text{ (electrochromic layer)}$$

It is possible here for protons to reach the cathode discharged, where they are.

A rear wall of glass or of bonded or foamed plastic is bonded to the rear in order to seal the system.

Before a layered system of this type is ready for use and can be operated, it must be charged with hydrogen. Hitherto, this charging has been carried out by exposing an appropriate layered package to a hydrogen gas atmosphere while short-circuiting the first and second electrodes; during this operation, hydrogen diffuses into the layered package in an equilibrium reaction via the second electrode, which necessarily comprises a catalytic metal for cleaving the $H_2$ molecules into H atoms. Another possibility is to connect the first electrode as the negative electrode compared with the second electrode and to allow hydrogen ions to enter the electrochromic layered package via the catalytic, second electrode on application of a voltage. After charging with hydrogen ions, excess hydrogen on the rear of the second electrode must be burnt. Each of the two methods mentioned requires a catalytic second electrode for cleaving the $H_2$ molecules; in addition, the process for charging from an $H_2$ atmosphere is very complex since the layered packages must be handled in "glove boxes". After charging with hydrogen, the fact that the sealing of the finished layered package is significantly less than complete has been a problem.

Conventional electrochromic layered packages of the type described here are sealed by applying a backing after charging with hydrogen; such a backing is supposed both to "seal" a layered package of this type and also to protect the second electrode against external mechanical forces or chemical attack. A backing in the form of a bonded plate made of glass, metal or plastic or foamed plastic used hitherto was effectively only to a limited extent.

Only recently, a conventional electrochromic layered package has successfully been hermetically sealed by electrolytic application of a metal layer onto the second electrode, as described in the above cross-referenced application.

SUMMARY OF THE INVENTION

An object of the present invention is to provide a process for charging an electrochromic layered package with hydrogen, in which process the second electrode need not necessarily comprise an expensive, catalytic metal, in which process the amount of hydrogen during charging can be metered precisely, in which, if appropriate, a plurality of layered packages can be charged simultaneously, and which can be combined, if desired, with the application of a metal layer as the backing.

Another object is to provide an inexpensive process which can be conducted with little complexity compared with the known processes.

Still another object is to provide novel electrochromic layer packages resulting from such processes.

A still further object is to provide apparatus for the processes.

Upon further study of the specification and appended claims, further objects and advantages of this invention will become apparent to those skilled in the art.

One object is achieved by a process in which, before application of the backing and after application of he second electrode, to be followed by the backing, an electrochromic layered system is initially electrolytically charged with hydrogen from a hydrogen ion-containing electrolyte solution. As another aspect of the invention, in a second step, a metal layer is deposited reductively, as a backing which provides sealing against $H_2$ loss and $H_2O$ exchange, onto the second electrode, from a solution containing the pertinent metal as the ion. The layered package is generally completed after the deposition of the metal layer.

By means of this process, it is possible to produce the electrochromic layered package to be charged with hydrogen, using a relatively inexpensive, noncatalytic second electrode as an alternative to an electrode made from one of the platinum group metals or an alloy thereof. Such inexpensive, noncatalytic electrodes include but are not limited to electrodes made of nickel, tin, copper, lead, zinc, cobalt, and cadmium.

After the electrolytic charging of the electrochromic layered package with hydrogen, a metal layer is applied reductively as a backing to the second electrode in a subsequent step.

A particular advantage of the present invention is that the two process steps can be combined very simply since it is also possible to carry out the metal layer formation electrolytically. This means that, since charging and metal layer formation are of the same reaction type, i.e., electrolysis, several necessary operations (for example contacting of the electrodes, and dipping into and removal from the electrolyte solution(s)) need only be carried out once for these two process steps.

The first, transparent electrode after the substrate plate preferably comprises an ITO layer (ITO = indium tin oxide); this offers both excellent surface conductivity and transparency.

A very decisive advantage of the electrolytic charging of an electrochromic layered package with hydrogen compared with conventional charging from a hydrogen-containing gas atmosphere, where the dihydrogen molecules have to be split into hydrogen atoms on a catalytically acting metal surface with expenditure of energy, is the omission of a catalytic layer or catalytically acting electrode.

It is therefore also possible for the second electrode of the electrochromic layered package to be an inexpensive electrode made from, for example, nickel, instead of an expensive, catalytically acting layer or electrode, for example made from one of the Pt metals or alloys thereof.

The only requirement for this second electrode is that it must be permeable to the protons transported into the layered package during electrolytic charging.

There are numerous variants for carrying out the electrolysis (electrolysis) for charging the layered package with hydrogen and for applying the metal layer.

In one variant, the first electrode after the substrate plate is connected as the negative electrode (cathode) in orde to charge the layered package with hydrogen and, for electrolysis, the layered package and a counterelectrode are dipped into an electrolyte containing the hydrogen ions, hydrogen is transported into the layered package through application of a voltage and the other of the two electrodes of the layered package is subsequently connected as the negative electrode, and the layered package and a counterelectrode are dipped into an electrolyte containing the pertinent metal as the ion, and the metal layer is reverse-deposited on the second electrode, if necessary through application of a different voltage than during the hydrogen charging.

In this embodiment, it is also possible to remove the layered package from the proton-containing electrolyte solution after charging with hydrogen and, after connecting the second electrode as the cathode, to carry out the deposition of the metal layer after dipping into another electrolyte solution.

Application of a relatively high voltage, e.g., 1–5 V, normally 1–3 V, may be necessary, for example if the metal to be deposited is significantly more noble than hydrogen. The process can also be carried out by connecting the electrode (second electrode) in front of the backing as the negative electrode and, for electrolysis, dipping the layered package and a counterelectrode into a hydrogen ion-containing electrolyte, transporting hydrogen into the layered package through application of a suitable voltage, and subsequently dipping the layered package and a counterelectrode into another electrolyte containing the pertinent metal as the ion, and reverse-depositing the metal layer on the electrode connected as the cathode through application of a higher voltage than during the hydrogen charging.

In this process, the second electrode functions as the cathode both during the charging with hydrogen and during application of the metal layer, so that it is not necessary to switch between the first and second electrodes between the two processes. If both electrolysis reactions are carried out in one and the same vessel and if the metal ions are already present in the electrolyte solution during introduction of the hydrogen into the layered package, this introduction must take place at a voltage which is lower than the deposition voltage for the metal ions and the voltage must then be increased for deposition of the metal layer.

In this procedure, however, only undefinable amounts of hydrogen are introduced into the electrochromic layered package since the protons are discharged on the second electrode, which is still exposed, and some of the hydrogen produced may diffuse off into the solution or leave the electrode in the form of bubbles.

In a particularly advantageous embodiment of the process according to the invention, charging of the layered package with hydrogen and deposition of the metal layer from an electrolyte solution containing hydrogen ions and the pertinent metal as the ion are combined in an electrolysis tank and carried out consecutively by contacting both electrodes of the layered package and, for charging with hydrogen, initially connecting the first electrode behind the substrate plate, for example and ITO electrode, as the cathode and then making the second electrode into the cathode by switching over, and applying the metal layer, if necessary with an increase in the applied voltage.

The advantages of this method include: a saving in time, lower costs due to the omission of the catalytic electrode, and simple production conditions since no expensive and inconvenient process measures are required as otherwise employed in the conventional charging step employing a $H_2$ atmosphere. The amount of hydrogen to be introduced can also be metered chronometrically with high accuracy. It is advisable to dip a reference electrode into the particular electrolyte solution during the electrolytic processes in order to measure its potential, since both charging with hydrogen and coating with the metal layer can thereby be carried out reproducibly: a high quality of the finished layered package can in turn be favorably maintained by process control of this type.

Suitable metals for the metal layer formation include, e.g., lead, tin, nickel, cobalt, copper, zinc, gold or cadmium, with lead, tin and nickel being particularly suitable.

The electrolytic processes for charging with hydrogen and application of the metal layer are particularly suitable for mass production of very large numbers of electrochromic layered packages for use in anti-dazzle automobile rear-view mirrors since a relatively large number of electrochromic layered packages can at the same time be disposed consecutively and connected in series or disposed alongside one another and connected in parallel and connected to a voltage source.

In a series connection of this type, the dimensions of the dipping layered packages and of the pertinent electrolysis tank should be matched to one another so that the layered packages dipping into the electrolyte solution produce individual electrolysis cells separated from one another by the layered packages. The current yield is increased significantly by these individual, closed electrolysis cells since electrolytic short-circuiting cannot occur.

If the individual electrolysis cells are well separated and the electrochromic layered packages are connected in series, equal currents flow in them and the same amounts of charge flow into the various layered packages, irrespective of the individual potentials. The galvanic potentials occurring between the anode in each case dipping into the electrolyte solution and the cathode of the particular layered package may be different.

When connected in series, the conditions for charging are reproducible for different layered packages.

The reverse is the case for parallel connection. All layered packages are connected to the cathode of the voltage source used via one of their electrodes and an anode, as the counter electrode, dips into the electrolyte solution. In an arrangement of this type, charging with hydrogen and application of the metal layer to the individual layered packages take place under equal potentials between the countrrelectrode and the layered packages, while the charges imparted to the individual systems and the currents flowing through them may be different. A favorable arrangement is produced when the parallel connection is arranged in a manner such that the electrodes of the electrochromic layered systems are connected as cathodes and only on central counterelectrode is provided, from which all the layered packages are approximately the same distance.

In the case of parallel connection, identical conditions can also be achieved for all the layered packages using only one anode.

It is conceivable to eliminate the differences in the voltages applied or charges and currents flowing by connecting computer-controlled potentiometers between the voltage source and the electrochromic layered systems. The details of such computerized control systems are ascertainable from the literature, and computer-controlled potentiometers are commercially available from several producers.

The process according to the invention can also be carried out in a manner such that conditioning, i.e., adjustment of the water content of the electrochromic layered package, takes place at the same time as the charging with hydrogen. Due to electrolytic transport of the hydrogen ions into the electrochromic layered package from an electrolyte solution containing sufficient water, water molecules are simultaneously transported into the electrochromic package. The solvents used for preparation of the electrolyte solution(s) must be protic solvents. Water, acetone, methanol, ethanol, glycerol, glycols, propanols and mixtures of these solvents with one another have proven particularly suitable, the preferred solvent being water.

The pH in the electrolyte solution(s) is advantageously kept approximately constant during electrolysis. This can be achieved either by using a (Pt, $H_2$) electrode as the counterelectrode or by using buffered electrolyte solution(s). By keeping the conditions during charging with hydrogen and formation of the metal layer constant, constant and reproducible quality of the finished electrochromic layered packages is ensured. The hydrogen ion-containing electrolyte solution is prepared by adding mineral and/or carboxylic acids to the solvents mentioned. The choice of counter ions to the hydrogen ions and the metal ions deserves particular attention here. Particularly suitable anions are chloride, sulphate, phosphate and/or acetate ions. In each case, these anions must be stable under the electrolysis conditions chosen. A preferred anion is the sulfate ion.

Keeping the conditions during electrolysis constant as mentioned above also includes a constant concentration of the metal ions in the electrolyte solution during formation of the metal layer. This can only be achieved by using an electrolytccally dissolving electrode made from a metal sheet, the sheet comprising the same metal as deposited on the second electrode as the metal layer which provides sealing. A constant metal ion concentration during electrolysis causes a homogeneous formation of the metal layer with a uniform electrolysis rate without the deposition parameters during electrolysis having to be changed. Such metal electrodes are generally made of nickel, tin or copper, preferably nickel or tin.

The conductivity or conductivities of the electrolyte solution(s) used can be adjusted by adding conductive salts, for example potassium chloride. The process of discharging the metal ions and depositing the metal layer can be improved by adding complexing agents to the electrolysis solution. Any complexing agent conventional to electrode position processes can be used, e.g., cyanides and ammonium salts.

Whereas both the charging of the electrochromic layered package with hydrogen ions and the deposition of the backing, in the form of a metal layer, which provides sealing for the electrochromic layered package were carried out electrolytically in the embodiments of the invention described hitherto, it is also possible for the deposition of the metal layer to be carried out by chemical, currentless reduction using a reducing agent which acts selectively for the pertinent metal to be deposited. In this respect, the following literature references are cited: G. G. Gawrilow, Chemische (stromlose) Vernickelung [Chemical (currentless) Nickel-Plating], Eugen G. Lenze Verlag, Saulgau, Württ., 1974, Volume 15, Galvanotechnik series of publications.

The selectively acting reducing agents used are preferably complexborohydrides, such as, for example, sodium borohydride or dimethylammonium borohydride. The reduction of the metal ions present in the electrolyte solution takes place here directly on the second electrode with formation of the metal layer sealing the electrochromic layered package.

BRIEF DESCRIPTION OF THE DRAWINGS

The present invention is described in greater detail below with reference to preferred embodiments depicted in the drawings wherein.

DETAILED DESCRIPTION OF THE DRAWINGS

Figure 1:
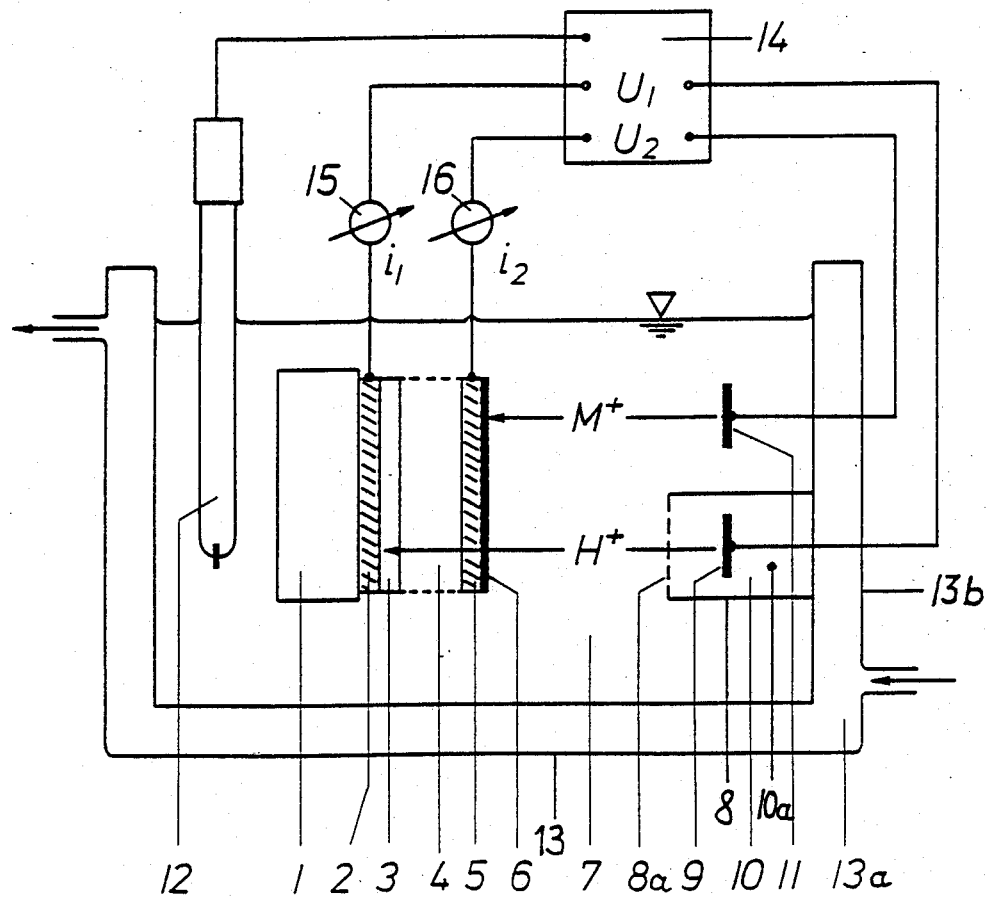
FIG. 1 is a schematic view of an electrolysis arrangement for the present invention.

FIG. 1 shows an electrolysis arrangement for carrying out the process according to the invention. An electrolysis tank 13 having a temperature-control jacket 13a through which a temperature-control liquid (temperature: 25° C.) flows contains an electrolte solution 7 containing 30 g $SnSO_4/l$ and 14 g $H_2SO_4/l$, the remainder being water.

In this electrolyte solution 7, there is an electrochromic layered package constructed from various layers. In the embodiment illustrated, the layered package has the following structure: a transparent substrate glass plate 1 carries, on its rear (in the viewing direction of the future mirror), a transparent ITO (first) electrode 2, which is likewise in the form of a layer and has been applied yy known processes, for example vapor-deposition. This is followed by a $WO_3$ layer 3 which is responsible for the electrochromicity, and then by further layers labelled 4 here, which complete the layered package together with a rear (second) electrode 5, which comprises a layer of vapor-deposited nickel. The active electrochromic surface area of each of the individual layers of the electrochromic system is 10 $cm^2$, the area of the substrate glass plate 1 being slightly larger than the area of the subsequent layers since the edge region of the substrate glass plate extends somewhat beyond the subsequent layers on all sides. Reference character 6 indicates the metal layer to be deposited according to the invention, which will be described in greater detail below. A $Pt/H_2$ electrode 9, connected to the anode of a voltage source 14, is located at a slight distance from the side wall 13b of the electrolysis tank 13 and in a central position behind the backing of the layered package. The distance between the backing of the layered package and the electrode 9 is 3 to 5 cm. The $Pt/H_2$ electrode 9 is surrounded by a tubular cover 8, which is attached at one end to the side wall 13b of the electrolysis tank 13 so as to be impermeable and is covered on its front face in front of the electrode 9 by a diaphragm 8a which is permeable to hydrogen ions, so that a closed chamber 10 is formed around the $Pt/H_2$ electrode 9. This chamber 10 contains a second electrolyte solution 10a, comprising 0.1 normal aqueous hydrochloric acid.

A flat electrode 11 made of tin is likewise located in a central position 3 to 5 cm behind the layered system and slightly away from the side wall 13b of the electrolysis tank 13 and in the vicinity of the $Pt/H_2$ electrode 9. The area of the electrode 11 is a multiple smaller than the cross-sectional area of the 10 $cm^2$ cross-section of the layered package (i.e. 4 $cm^2$). The electrode 11 is also connected, as the anode, to the voltage source 14. Likewise connected to the voltage source 14 are the ITO layer 3, via an ammeter, and the rear electrode 5 via an ammeter 16, both as the cathode and so that different voltages can be applied separately. In addition, a commercially available Thalamide ® electrode, as the reference electrode 12, dips into the metal ion-containing electrolyte solution 7.

According to an embodiment of the invention, the following procedure is adopted.

A voltage, kept constant via the reference electrode 12 so that a potential difference of 1.3 volts compared with the electrode 2 exists at the reference electrode 12, is initially applied to the electrodes 2 and 9. While the electrolyte solution 7 is stirred, hydrogen ions are transported into the electrochromic layer 3 of the layered package for about 5 seconds at a current density of 3 $mA/cm^2$. The pH thereof can be kept constant by using the $Pt/H_2$ electrode 9 or by means of buffered electrolyte solutions 7 and 10. When the charging of the layered system with hydrogen ions is complete, a higher voltage is now applied to the electrodes 5 and 11 which is regulated so that a constant potential difference of 3 volts compared with the electrode 5 is measured at the reference electrode 12. While stirring, tin ions are deposited as an even tin layer 6 on the rear electrode 5 from electrolyte solution 7 for three minutes at a current density of 20 $mA/cm^2$. When the deposition process is complete, the tin layer 6 has a thickness of approximately 3 microns. These two-step processes can be quantitatively monitored and controlled by measuring the currents using the ammeters 15 and 16 during charging with hydrogen ions and during reverse-charging of the layered package with tin.

Since the electrode 11 likewise comprises tin, the solution 7 does not become depleted in tin ions during the deposition process since the electrode 9 dissolves electrolytically to the same extent as tin ions are deposited on the rear electrode 5. This maintenance of the tin ion concentration in the solution and of the pH of the solutions 7 and 10a, and the temperature control and the monitoring and maintenance of the deposition parameters of current and voltage ensure high and constant quality of the resultant layered package charged with hydrogen ions and hermetically sealed by a metal layer.

Figure 2:
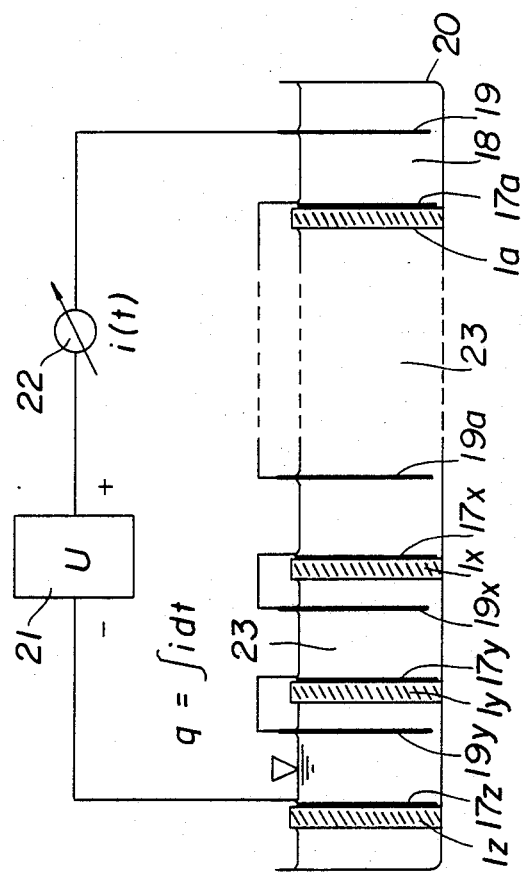
FIG. 2 is a particular embodiment of the invention in which the electrochromic layered packages are connected in series for electrolysis.

FIG. 2 depicts another embodiment of the present invention.

A plurality of layered packages 17a . . . 17z, each of which is vapor-deposited on a glass substrate 1a . . . 1z, are arranged connected in series. The dimensions of these layered packages 17a . . . 17z are matched to the dimensions of an electrolysis trough 20 having an essentially rectangular base and cross-sectional area in a manner such that the electrolysis trough 20 is, as it were, divided into a plurality of mutually delimited electrolysis cells 23, assuming layered packages 17a . . . 17z are introduced parallel to one another and in the same direction perpendicular to the longitudinal axis of the electrolysis trough 20. The anode of a voltage source 21 is connected via an ammeter 22 to a counterelectrode 19 which dips into a hydrogen ion-containing metal salt solution 18 behind the final layered package 17a before one front face of the electrolysis trough. All the individual electrolysis cells are filled with this solution 18. The cathode of the voltage source 21 is connected to the rear electrode of the final layered package 17z before the other front face of the electrolysis trough. In order to ensure undisturbed charging transport through the individual electrolysis cells 23 without short-circuiting, a further counterelectrode 19a extends from the rear electrode of the layered package 17a directly adjacent to the counterelectrode 19 into the electrolysis cell 23 formed by this and the next layered package. A further counterelectrode . . . 19x, 19y of this type is likewise located on each of the further layered packages . . . 17x, 17y. The counterelectrode 19y applied to the penultimate layered package 17y in this case forms the counterelectrode for the final layered package 17z, whose rear electrode is connected directly to the voltage source 21. When a voltage is applied between the counterelectrode 19 and the rear electrode of the layered package 17z, the individual layered packages are initially charged with hydrogen ions and, when the voltage is reduced, each of the rear electrodes is provided with a metal layer. The advantages of this method are discussed in the Summary of the Invention section.

Figure 3:
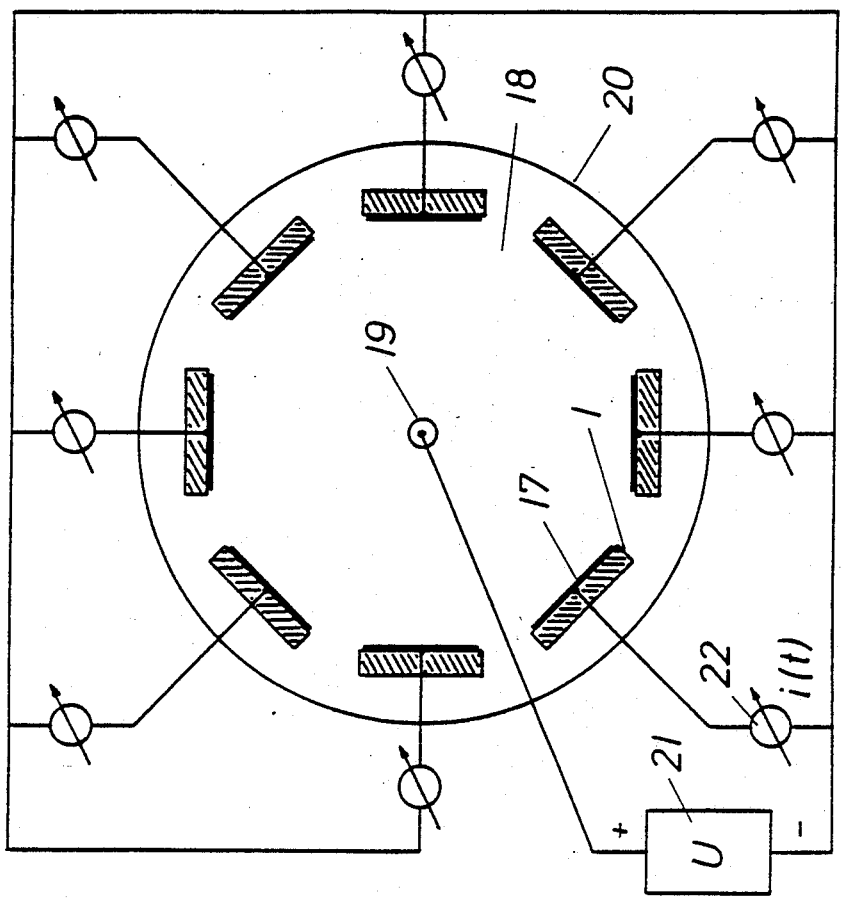
FIG. 3 is another embodiment in which the electrochromic layered packages are connected in parallel.

FIG. 3 shows a further embodiment of the invention. In a cylindrical electrolysis trough 20, a plurality of layered packages 17 are disposed concentrically about a counterelectrode 19 which is disposed in the center of an electrolysis trough 20 and is connected to the anode of a voltage source 21. The layered packages, which can be switched over via ITO electrodes and rear electrodes, are connected in parallel to the cathode of the voltage source 21, in each case via an ammeter 22. The charging and coating are carried out analogously to the description given for FIG. 1. The advantages of the parallel connection are discussed in the Summary of the Invention section above.

The entire texts of all applications, patents and publications, if any, cited above and below, and of corresponding application P 37 36 076.0 (the priority document), are hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for producing an electrochromic layered package utilizing hydrogen as a transport ion, said layered package comprising a transparent substrate plate disposed at the front of said layered package, at least two electrodes comprising a first electrode being transparent and arranged first after said substrate plate, at least one electrochromic layer, a hydrogen-storing layer, a hydrogen ion-conducting layer, a second electrode, and a backing or sealing the layered package and directly following the second electrode, said process comprising, prior to sealing the electrochromic layered system, in a first step, charging the unsealed package electrolytically with hydrogen from a hydrogen ion-containing electrolyte solution, and, in a second step, reductively depositing a metal layer as a backing onto the second electrode from a solution containing the latter metal as the ion, said backing providing sealing against $H_2$ loss and $H_2O$ exchange, thereby completing the layered package.

2. A process according to claim 1, wherein said transparent electrode consists essentially of indium tin oxide.

3. A process according to claim 1, wherein the second electrode is produced from a metallic layer.

4. A process according to claim 1, wherein the second electrode consists essentially of a platinum group metal or an alloy thereof.

5. A process according to claim 1, wherein the metal layer is deposited electrolytically.

6. A process according to claim 4 wherein, in order to charge the layered package with hydrogen, the first electrode after the substrate plate is connected as a cathode, and, for electrolysis, the layered package and a counterelectrode are dipped into a hydrogen ion-containing electrolyte solution, hydrogen is transported into the layered package through application of a voltage; and the other of the two electrodes of the layered package is subsequently connected as the negative electrode, and the layered package and a counterelectrode are dipped into an electrolyte solution containing the latter metal as the ion, and the metal layer is reverse-deposited on the second electrode.

7. A process according to claim 5, wherein the second electrode is connected as a cathode and, for electrolysis, the layered package and a counterelectrode are dipped into a hydrogen ion-containing electrolyte solution, hydrogen is transported into the layered package through application of a suitable voltage, and the layered package and a counterelectrode are subsequently dipped into an electrolyte solution containing the latter metal as the ion, and the metal layer is reverse-deposited on the electrode connected as the cathode.

8. A process according to claim 6, wherein the charging of the layered package with hydrogen and the deposition of the metal layer from an electrolyte solution containing hydrogen ions and the latter metal as the ion are combined in an electrolysis tank and carried out consecutively by contacting the two electrodes of the layered package and, for charging with hydrogen, firstly connecting said first electrode as cathode and then switching over to make the second electrode the cathode. and depositing the metal layer.

9. A process according to claim 1, wherein a reference electrode is additionally dipped into the electrolyte solution in order to control the electrolysis process.

10. A process according to claim 1, wherein a layer of Pb, Sn, Ni, Co, Cu, Zn, Au or Cd is deposited as the metal layer.

11. A process according to claim 1, wherein, for electrolysis, a plurality of layered packages are disposed consecutively and connected in series.

12. A process according to claim 1 wherein, for electrolysis, a plurality of layered packages are disposed alongside one another and connected in parallel.

13. A process according to claim 12, wherein the parallel connection is arranged in a manner such that each of the electrodes of the electrochromic layered system is connected as the cathode via potentiometers and only one central counterelectrode is provided.

14. A process according to claim 1, wherein, at the same time as charging with hydrogen, the electrochromic layered package is conditioned by adding or removing water from said layered package.

15. A process according to claim 1, wherein the amount of electrolytically produced hydrogen is monitored coulombetrically, and the amount of hydrogen introduced into the layered package is optimally metered coulombetrically.

16. A process according to claim 1, wherein the electrolyte solution comprises at least one protic solvent.

17. A process according to claim 16, wherein the protic solvent is water, acetone, methanol, ethanol, glycerol, a glycol, propanol or mixtures thereof.

18. A process according to claim 6, wherein the counterelectrode is a (Pt, $H_2$) counterelectrode.

19. A process according to claim 1, wherein at least one electrolyte solution is buffered.

20. A process according to claim 1, wherein the hydrogen ion-containing electrolyte solution is produced using mineral and/or carboxylic acids as hydrogen-ion donor.

21. A process according to claim 1, wherein chloride, sulphate, phosphate and/or acetate ions are used as counterions of the metal ions.

22. A process according to claim 1, wherein the concentration of metal ions in the electrolytic solution is kept constant during electrolysis by using an electrode of the same metal which dissolves electrolytically.

23. A process according to claim 1, wherein the conductivity of at least one electrolyte solution is adjusted by adding conductive salts.

24. A process according to claim 1, wherein complexing agents are added to the electrolyte solution in order to improve discharge of the metal ions and deposition as a metal layer.

25. A process according to claim 1, wherein the metal layer is deposited on the second electrode without current by using a selective reducing agent for the latter metal to be deposited.

26. A process according to claim 25, wherein the selective reducing agent is a complex borohydride.

27. A process according to claim 1, wherein the second electrode consists essentially of nickel.

28. A process according to claim 1, wherein the charging step is conducted out of contact with any catalytically active metal surface capable of splitting molecular hydrogen into hydrogen atoms.

29. An electrochromic package as produced by the process of claim 1.

30. An electrochromic package as produced by the process of claim 27.

31. An electrochromic package as produced by the process of claim 28.

* * * * *